(12) United States Patent
Harada et al.

(10) Patent No.: US 11,582,374 B2
(45) Date of Patent: Feb. 14, 2023

(54) READING DEVICE

(71) Applicant: TOSHIBA TEC KABUSHIKI KAISHA, Tokyo (JP)

(72) Inventors: Shintaro Harada, Izunokuni Shizuoka (JP); Shinsuke Yajima, Mishima Shizuoka (JP); Yoshiya Yamada, Mishima Shizuoka (JP); Hidehiro Naito, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/516,732

(22) Filed: Nov. 2, 2021

(65) Prior Publication Data

US 2022/0239813 A1    Jul. 28, 2022

(30) Foreign Application Priority Data

Jan. 22, 2021 (JP) .............................. JP2021-008747

(51) Int. Cl.
*H04N 5/225* (2006.01)
*G06Q 20/20* (2012.01)

(52) U.S. Cl.
CPC ......... *H04N 5/2256* (2013.01); *G06Q 20/208* (2013.01); *H04N 5/2252* (2013.01)

(58) Field of Classification Search
CPC .. G06Q 20/208; G07G 1/0045; H04N 5/2252; H04N 5/2256
See application file for complete search history.

(56) References Cited

U.S. PATENT DOCUMENTS

| | | | |
|---|---|---|---|
| 10,460,574 B2* | 10/2019 | Barkan | G06V 20/52 |
| 2010/0157100 A1* | 6/2010 | Roquemore, III | H04N 5/2256 348/E5.022 |
| 2012/0193407 A1* | 8/2012 | Barten | G06K 7/1096 235/375 |
| 2014/0089121 A1* | 3/2014 | Kaminsky | G06Q 20/20 705/23 |
| 2018/0307881 A1* | 10/2018 | Naito | G07G 1/0018 |
| 2021/0097517 A1* | 4/2021 | Handshaw | G07G 1/0063 |
| 2022/0058384 A1* | 2/2022 | Albines | H04N 1/19594 |
| 2022/0301400 A1* | 9/2022 | Takasu | G06K 7/10752 |

FOREIGN PATENT DOCUMENTS

JP    2013-50999    3/2013

* cited by examiner

*Primary Examiner* — Amy R Hsu
(74) *Attorney, Agent, or Firm* — Amin, Turocy & Watson, LLP (57) ABSTRACT

According to one embodiment, a reading device is a device for obtaining information for identifying a merchandise, and includes a housing, an imaging unit, a main illumination unit, and an auxiliary illumination unit. The housing includes a reading window having a property of transmitting light. The imaging unit is built in the housing and captures an image through the reading window. The main illumination unit illuminates an imaging target located on the opposite side of the imaging unit with the reading window interposed therebetween by emitting light outward the housing, and is arranged at the upper edge portion of the reading window. The auxiliary illumination unit illuminates the imaging target by emitting light outward the housing through the reading window, and is arranged inner side than the main illumination unit.

20 Claims, 7 Drawing Sheets

READING DEVICE

CROSS-REFERENCE TO RELATED APPLICATION

This application is based upon and claims the benefit of priority from Japanese Patent Application No. 2021-008747, filed on Jan. 22, 2021, the entire contents of which are incorporated herein by reference.

FIELD

Embodiments described herein relate generally to a reading device, a reading method, and a point of sale terminal.

BACKGROUND

In the related art, a sales data processing device such as a point-of-sales (POS) terminal includes a reading device that acquires a code image such as a bar code or a two-dimensional code or an image of an appearance of a merchandise as information for identifying the merchandise. The reading device has a built-in imaging unit configured with an image sensor or the like, and captures a code image or an image of a surface of a merchandise through a transparent reading window provided in a portion of the housing.

The above-mentioned reading device in the related art is provided in the housing with a light source (light emitting diode (LED) or the like) for illuminating the code image or the surface of the merchandise that is an imaging and reading target. If the light source is configured to emit the light sufficiently for reading, it is inconvenient for the user to feel glare.

DETAILED DESCRIPTION

The problem to be solved by the present disclosure is to provide a reading device that allows a user to be less likely to feel glare.

In general, according to one embodiment, a reading device is a device for obtaining information for identifying a merchandise, and the reading device includes a housing, an imaging unit, a main illumination unit, and an auxiliary illumination unit. The housing includes a reading window having a property of transmitting light. The imaging unit is built in the housing and captures an image through the reading window. The main illumination unit illuminates an imaging target located on an opposite side of the imaging unit with the reading window interposed therebetween by emitting light outward the housing and is arranged on an upper edge portion of the reading window. The auxiliary illumination unit illuminates the imaging target by emitting the light outward the housing through the reading window and is arranged inner side than the main illumination unit.

Figure 1:
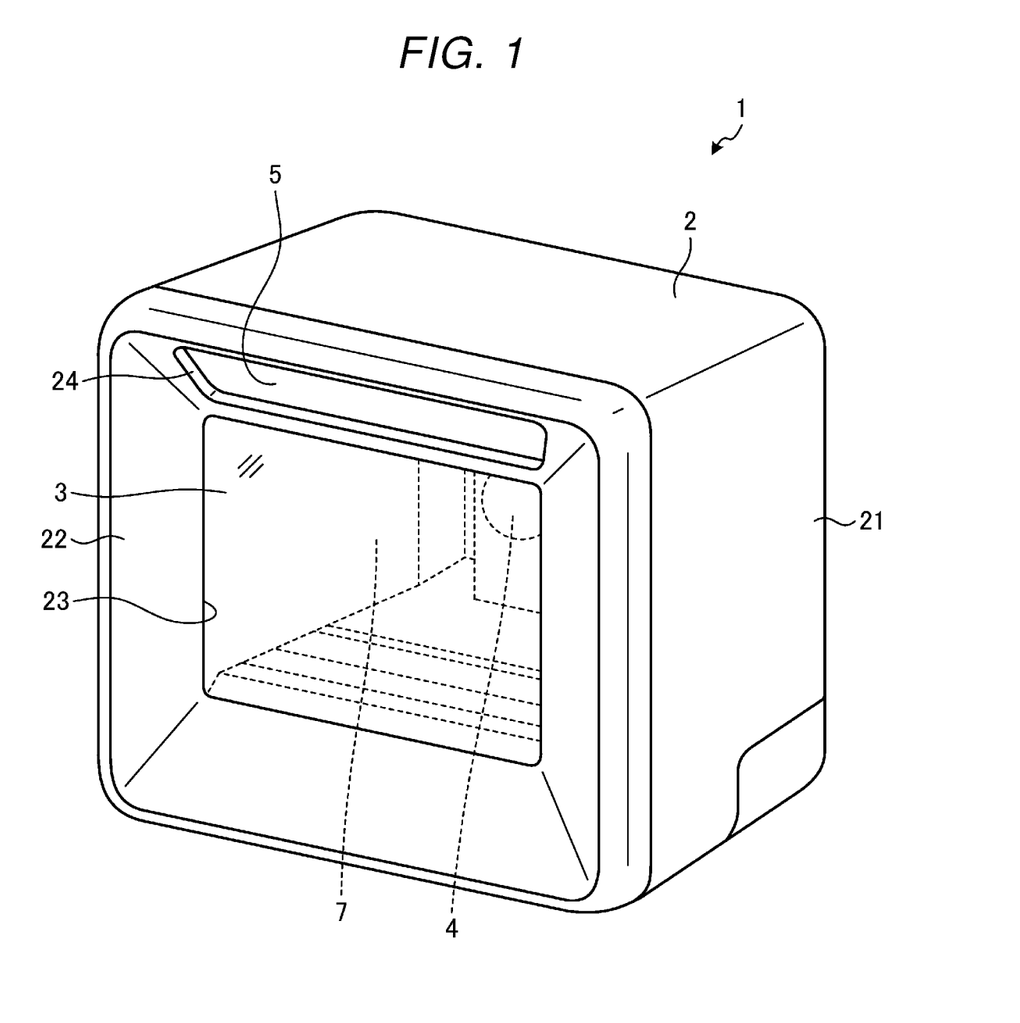
FIG. 1 is a perspective view illustrating an example of an appearance of a reading device of an embodiment as viewed from above.
Figure 2:
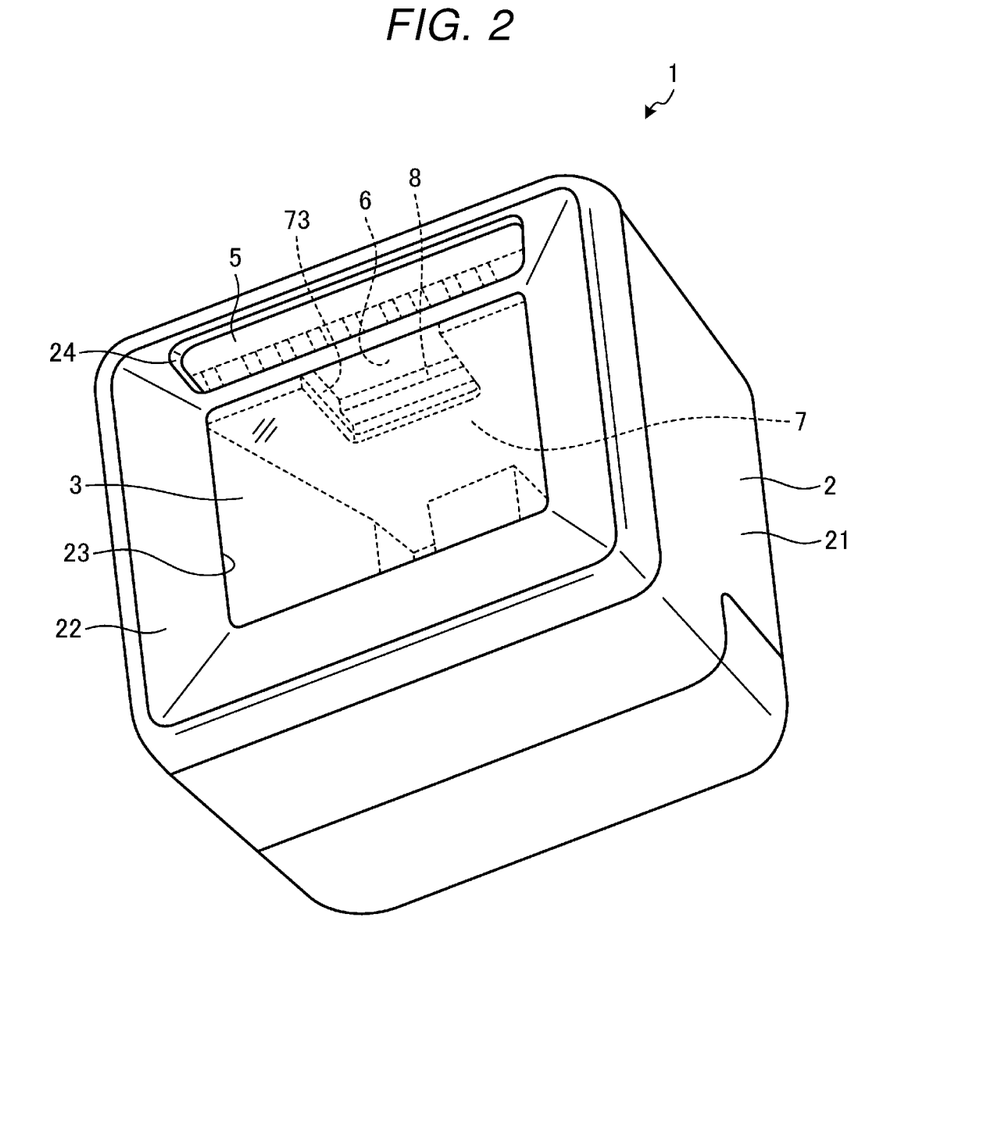
FIG. 2 is a perspective view illustrating an example of the appearance of the reading device as viewed from below.

An embodiment will be described with reference to the drawings. FIG. 1 is a perspective view illustrating an example of an appearance of a reading device 1 of the embodiment as viewed from above. FIG. 2 is a perspective view illustrating an example of the appearance of the reading device 1 as viewed from below. It is noted that a standing position of a user (operator) of the device is the front side in the figure.

The reading device 1 is a device for obtaining information that identifies a merchandise. The reading device 1 reads (extracts) information that identifies the merchandise from an image data (imaging data) obtained by imaging the merchandise. The information that identifies the merchandise is, for example, a code symbol attached to a surface of the merchandise or a feature data of the appearance of the merchandise. The former code symbol is, for example, a bar code or a two-dimensional code. The latter feature data is used for object recognition processing. The object recognition processing is a process of calculating, for example, a degree of similarity (numerical value indicating a degree of similarity) between the feature data extracted from the imaging data and the feature data of each merchandise stored in a database in advance and setting a merchandise having a high degree of similarity as a candidate.

It is noted that object recognition seen in the object recognition processing is called generic object recognition. With respect to the generic object recognition, various recognition techniques are explained in the following documents. Keiji Yanai, "Current Status and Future of Generic Object Recognition", IPSJ Journal, Vol. 48, No. SIG16 [Search on Aug. 10, 2010], Internet <URL: http://mm.cs.uec.ac.jp/IPSJ-TCVIM-Yanai.pdf>

In addition, the technology for performing the generic object recognition by dividing an image into regions for each object is explained in the following documents. Jamie Shotton et al., "Semantic Texton Forests for Image Categorization and Segmentation", [Search on Aug. 10, 2010], Internet <URL: http://citeseerx.ist.psu.edu/viewdoc/download?doi=10.1.1.1 45.3036&rep=rep1&type=pdf>

The reading device 1 includes a housing 2, an imaging unit 4 (refer to FIG. 1), a main illumination unit 5, and an auxiliary illumination unit 6 (refer to FIG. 2).

The housing 2 includes a container 21 for containing the imaging unit 4 and the like and a front cover 22 which is a lid for opening and closing the opening of the container 21. As an example of the shape of the housing 2, the container 21 has a rectangular parallelepiped box shape, and the front cover 22 has a square shape.

The housing 2 includes a reading window 3. The reading window 3 is configured with a flat plate made of, for example, a transparent resin or a glass and has a property of transmitting light.

Figure 3:
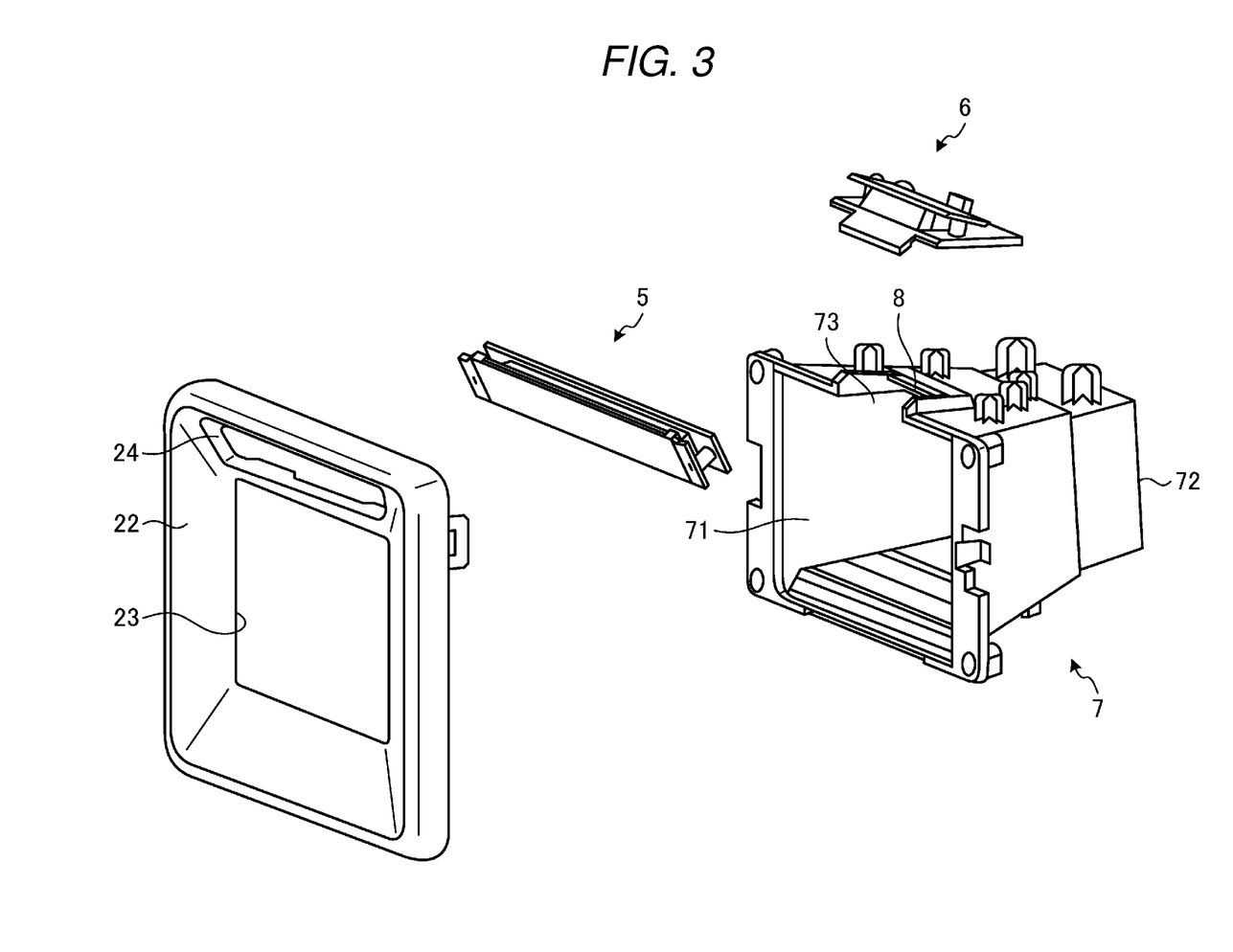
FIG. 3 is a schematic exploded perspective view illustrating an example of a configuration of the reading device.

Herein, FIG. 3 is a schematic exploded perspective view illustrating an example of the configuration of the reading device 1. The front cover 22 has a frame-like shape having a hole 23 at the center into which the reading window 3 is fitted. In addition, the front cover 22 has a hole 24 into which the main illumination unit 5 is fitted at a corresponding position above the reading window 3.

Furthermore, the front cover 22 has a shape in which the outer peripheral portion, which is a portion surrounding the reading window 3, projects (protrudes) toward the front of the portion provided with the hole 23. Herein, the front is the front for the user who uses the reading device 1, that is, the opposite side of the imaging unit 4 with the reading window 3 interposed therebetween.

The above-mentioned shape enables the merchandise to be less likely to collide with the reading window 3 even if the user performs an operation of causing the reading device 1 to read the merchandise at a position close to the reading window 3. More specifically, even if the user brings the merchandise too close to the reading window 3, there is a high possibility that the merchandise touches the outer peripheral portion of the front cover 22 before the reading window 3. Therefore, due to this shape, it is possible to allow the reading window 3 to be less likely to be destroyed or contaminated by the merchandise.

The imaging unit 4 (refer to FIG. 1) includes an image sensor such as a charge coupled device (CCD) or a complementary MOS (CMOS) and is built in the back side of the housing 2 if the reading window 3 is on the front side. The imaging unit 4 captures an image through the reading window 3. More specifically, the imaging unit 4 images the merchandise or the like through the reading window 3 and outputs data (imaging data) of the image obtained by the imaging.

The main illumination unit 5 is arranged on the upper edge of the reading window 3 and emits light outward the housing 2, so that an imaging target (for example, a merchandise) located on the opposite side of the imaging unit 4 with the reading window 3 interposed therebetween is illuminated. In addition, the main illumination unit 5 is provided so as to be inclined so that the emitted light gradually travels away from the housing 2 while heading downward from the above the reading window 3.

The auxiliary illumination unit 6 (refer to FIGS. 2 and 3) is arranged in the inside from the main illumination unit 5 and illuminates the imaging target by emitting light outward the housing 2 through the reading window 3. In addition, the auxiliary illumination unit 6 is also provided so as to be inclined so that the emitted light gradually travels away from the housing 2 while heading downward from the above the reading window 3.

Figure 4:
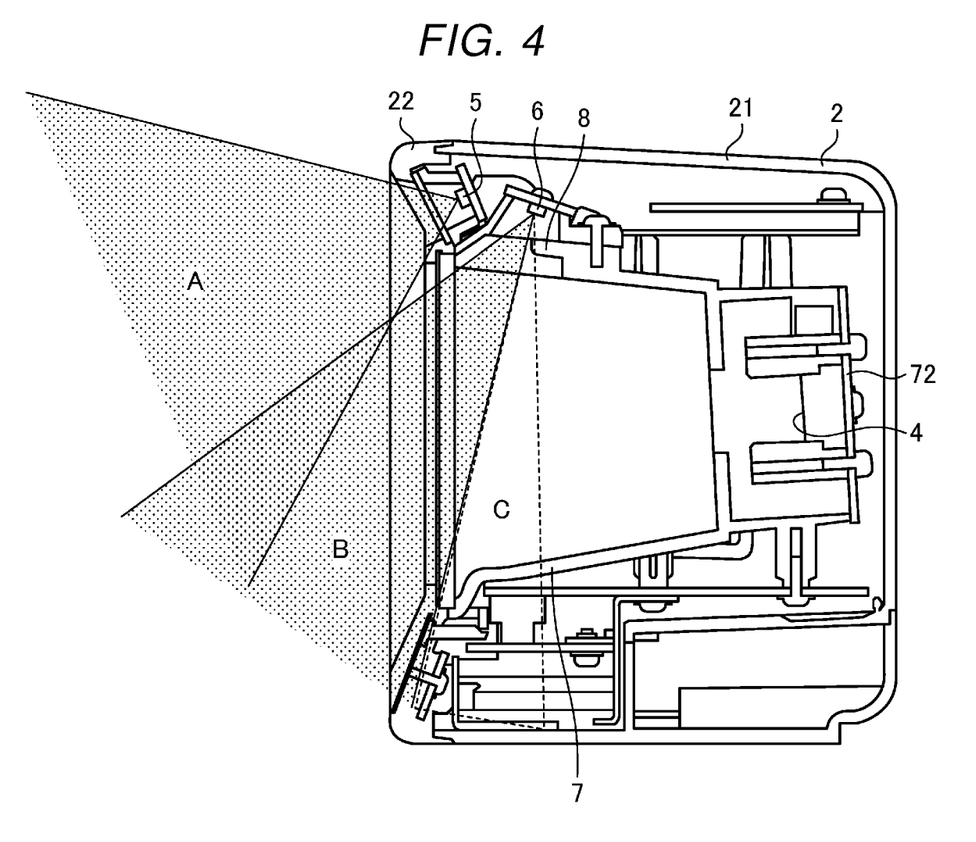
FIG. 4 is a schematic longitudinal side view illustrating an example of an internal structure of the reading device.

In addition, the reading device 1 includes a hood 7. Herein, FIG. 4 is a schematic longitudinal side view illustrating an example of an internal structure of the reading device 1 of the embodiment. The hood 7 has a shape facing the inner surface of the container 21 with a space opened and has an opening 71 on the reading window 3 side. The imaging unit 4 is fixed to the surface 72 on the back side of the hood 7 facing the reading window 3.

Returning to FIG. 3, a notch 73 for taking in the light emitted by the auxiliary illumination unit 6 is provided on the upper edge of the hood 7. In addition, the reading device 1 includes a light shielding unit 8. The light shielding unit 8 has a protruding shape like an eave to blocks a portion of the light shining from the notch 73.

Figure 5:
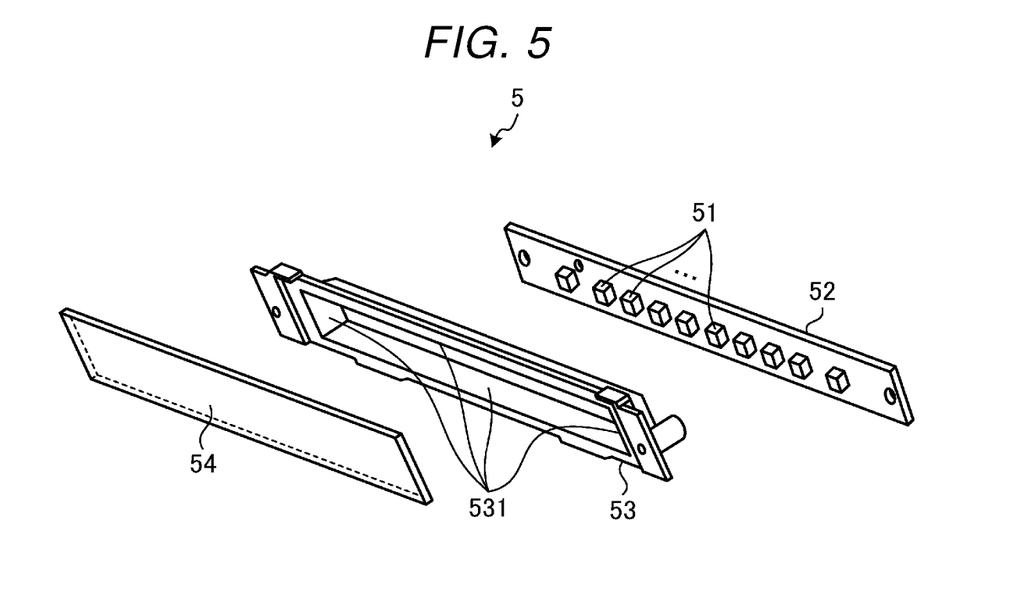
FIG. 5 is a diagram illustrating an example of a configuration of a main illumination unit.

FIG. 5 is a diagram illustrating an example of a configuration of the main illumination unit 5. The main illumination unit 5 includes a board 52 on which a light source 51 is mounted, a reflecting member 53, and a diffusion plate 54. The light source 51 is, for example, a light emitting diode (LED). The amount of light of the light source 51 can be changed by changing the value of the current for driving.

The board 52 is retained in a state where, for example, a plurality of light sources 51 are arranged side by side in a line. Hereinafter, when referring to a unity of a plurality of light sources 51, this is referred to as a group of light sources 51.

The reflecting member 53 has a frame-like shape surrounding the light sources 51 aligned on the board 52, and the inner peripheral surface is a reflecting surface 531 having a property of reflecting light. The reflecting member 53 has four reflecting surfaces 531 so that, for example, the reflecting surfaces 531 surround the group of light sources 51 in four directions, up, down, left, and right directions.

The reflecting surface 531 is an example of a reflecting portion. By reflecting the light emitted by the light source 51, the reflecting surface 531 directs the light path toward the merchandise (imaging target) located on the opposite side of the imaging unit 4 with the reading window 3 interposed therebetween.

In this embodiment, four reflecting surfaces 531 are provided, but the number of reflecting surfaces 531 does not matter in the implementation. For example, in the implementation where a plurality of the light sources 51 are arranged side by side in the horizontal direction as in the embodiment, if the reflecting surfaces 531 are arranged above and below the group of light sources 51, which is effective for increasing the light incident on the diffusion plate 54.

In addition, it is preferable that at least the reflecting surface 531 of the reflecting member 53 is made of a material having a property of easily reflecting light such as plating or a white mold, because it is easy to increase the light incident on the diffusion plate 54.

The diffusion plate 54 diffuses the light taken in from one surface and emits the light from the other surface. In this example, the diffusion plate 54 takes in and diffuses the light emitted by the light source 51 and the light reflected by the surface of the board 52 and the reflecting surface 531 after the light source 51 is emitted.

The main illumination unit 5 as described above is configured by setting the output of the light source 51 or by selecting the material for the diffusion plate 54 so that the merchandise located in the space of a predetermined range (for example, the range A in FIG. 4, described later) can be sufficiently illuminated. It is noted that the above-mentioned "sufficiently illuminated" is intended to obtain a brightness to the extent that the merchandise information is sufficiently extracted based on the data of the image captured by the imaging unit 4.

Figure 6:
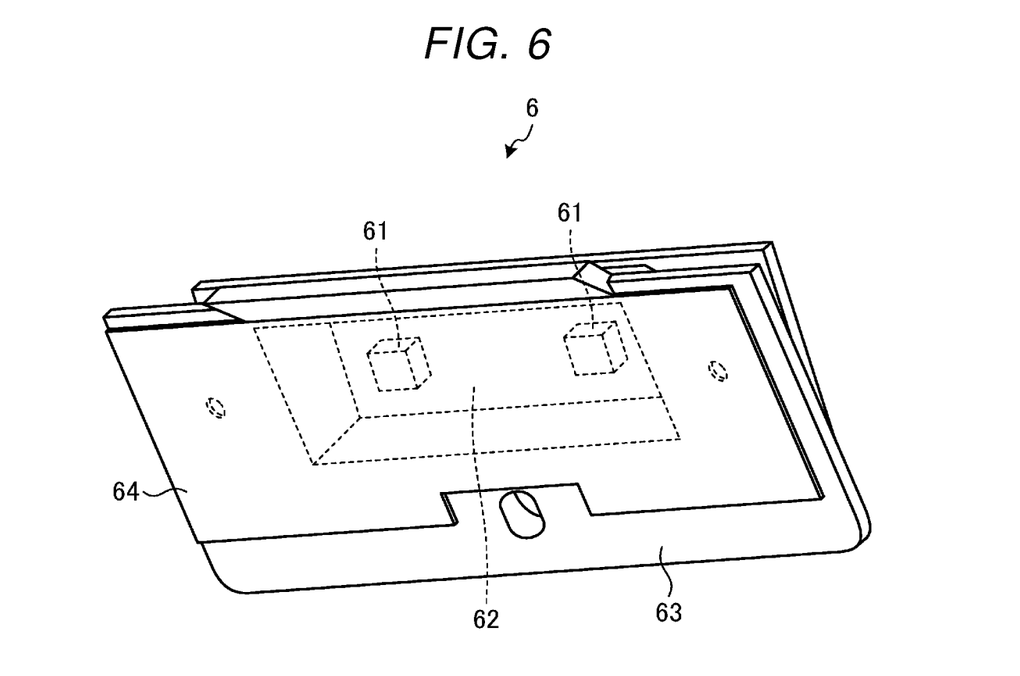
FIG. 6 is a perspective view illustrating an example of an appearance of an auxiliary illumination unit as viewed from below.
Figure 7:
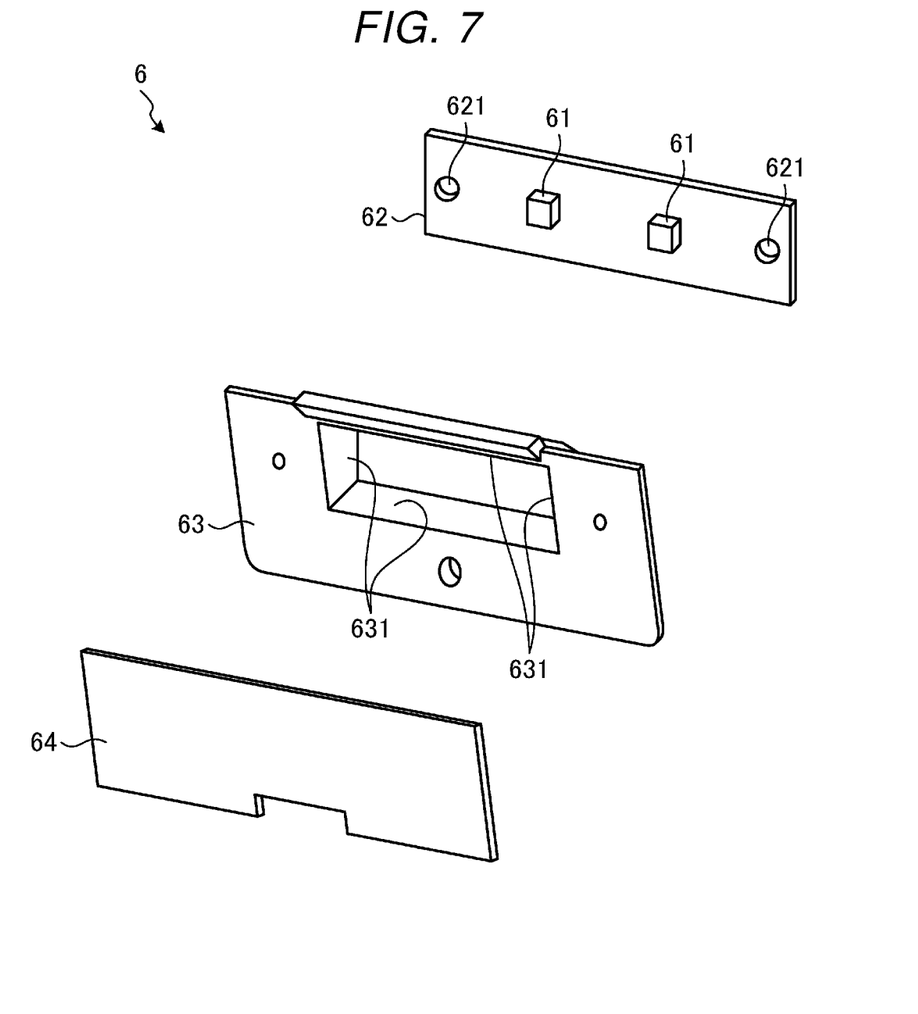
FIG. 7 is a diagram illustrating an example of a configuration of the auxiliary illumination unit.

FIG. 6 is a perspective view illustrating an example of an appearance of the auxiliary illumination unit 6 as viewed from below. FIG. 7 is a diagram illustrating an example of a configuration of the auxiliary illumination unit 6. The auxiliary illumination unit 6 includes a board 62 on which the light source 61 is mounted, a mounting member 63, and a diffusion film 64. The light source 61 is, for example, an LED. The board 62 is retained in a state where, for example, a plurality of the light sources 61 are arranged side by side in a line. Hereinafter, when referring to a unity of a plurality of light sources 61, this is referred to as a group of light sources 61.

The mounting member 63 is interposed between the board 62 and the diffusion film 64, and the group of light sources 61 and the diffusion film 64 are allowed to face each other with an appropriate space opened therebetween. In addition, the mounting member 63 has an inner peripheral surface 631 that surrounds a space interposed between the board 62 and the diffusion film 64. The light emitted by the light source 61 is incident on the diffusion film 64 directly or by being reflected by the surface or inner peripheral surface 631 of the board 62.

The diffusion film 64 diffuses the light taken in from one surface and emits the light from the other surface. In this example, the diffusion film 64 takes in and diffuses the light emitted by the light source 61 and the light reflected by the surface and the inner peripheral surface 631 of the board 62 after the light is emitted by the light source 61. It is noted that the diffusion film 64 may be thinner than the diffusion plate 54, and may be, for example, a sheet-like film having an emboss on one surface.

The auxiliary illumination unit 6 as described above is configured by setting the output of the light source 61 or by selecting the material for the diffusion film 64 so that the merchandise located in the space of a predetermined range (for example, a range B in FIG. 4, described later) can be sufficiently illuminated. It is noted that the above-mentioned "sufficiently illuminated" is intended to obtain a brightness to the extent that the merchandise information is sufficiently extracted based on the data of the image captured by the imaging unit 4.

Figure 8:
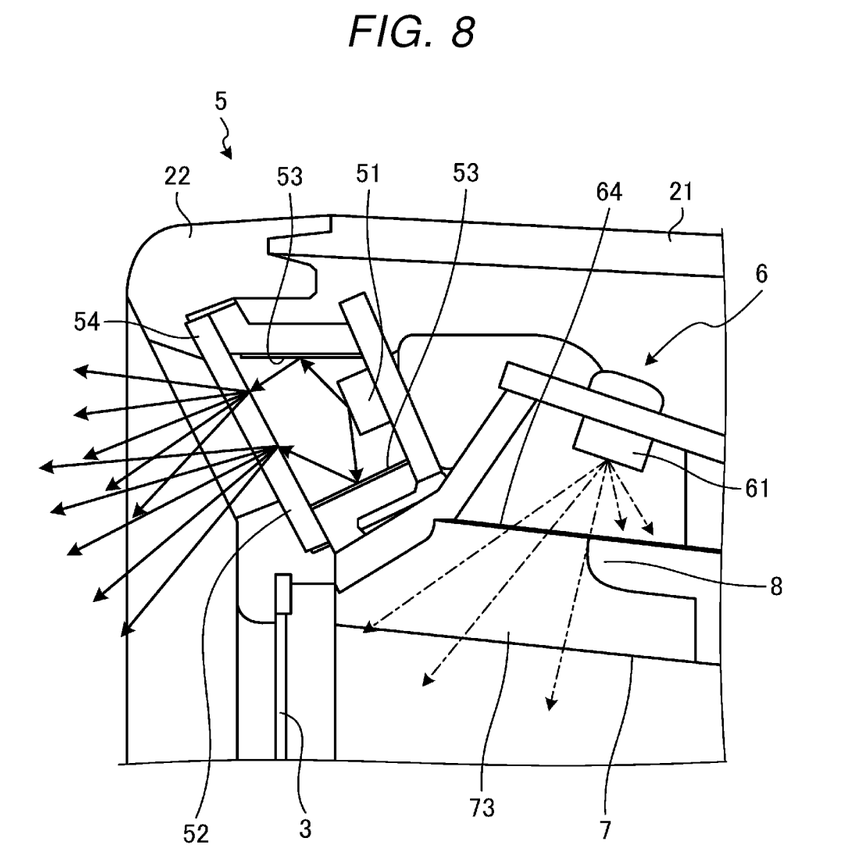
FIG. 8 is a diagram illustrating an example of a light path in the main illumination unit and the auxiliary illumination unit.

FIG. 8 is a diagram illustrating an example of a light path in the main illumination unit 5 and the auxiliary illumination unit 6. The illumination by the main illumination unit 5 and the auxiliary illumination unit 6 will be described with reference to an example of the light path in the main illumination unit 5 and the auxiliary illumination unit 6 illustrated in this figure and FIG. 4.

The light emitted by the light source 51 of the main illumination unit 5 travels to be forward and downward inclined from the above the reading window 3. The light emitted by the light source 51 and directly incident on the diffusion plate 54 and the light emitted by the light source 51, reflected by the reflecting member 53, and incident on the diffusion plate 54 are diffused by passing through the diffusion plate 54, and proceed to a space that is the outside of the housing 2 and in front of the reading window 3 for the user, to illuminate the space.

The range covered with illumination by the main illumination unit 5 is, for example, the range (hereinafter referred to as range A) indicated by halftone dots denoted by a reference numeral A in FIG. 4. It is noted that the above-mentioned "covered with illumination" is intended to obtain a brightness to the extent that the merchandise information is sufficiently extracted based on the data of the image captured by the imaging unit 4.

As illustrated in FIG. 4, there is a possibility that the range A covered with illumination by the main illumination unit 5 may be a range slightly away from the reading window 3. However, in some cases, the user may perform an operation of causing the reading device 1 to read the merchandise that is close to the reading window 3. Therefore, the reading device 1 covers the illumination at a position close to the reading window 3 by the auxiliary illumination unit 6.

As illustrated in FIG. 8, the light emitted by the light source 61 of the auxiliary illumination unit 6 travels to be forward and downward inclined from a position inside and above the reading window 3. The light emitted by the light source 61 is diffused by passing through the diffusion film 64, passes through the reading window 3, travels to a space that is outside the housing 2 and in front of the reading window 3 for the user, and illuminates the space.

The range covered with illumination by the auxiliary illumination unit 6 is, for example, the range (hereinafter referred to as a range B) indicated by halftone dots denoted by a reference numeral B in FIG. 4. The range B is a range outside the reading window 3 and adjacent to the reading window 3. In addition, the range B includes the lowermost portion of the reading window 3. Accordingly, it is possible to read the merchandise information without exception in the space in front of the reading window 3 for the user.

In addition, the illumination by the auxiliary illumination unit 6 is blocked by the light shielding unit 8 in the range (hereinafter referred to as a range C) denoted by a reference numeral C in FIG. 4. That is, the range C is not illuminated by the auxiliary illumination unit 6. Accordingly, the inner surface of the hood 7 is less likely to be illuminated, so that it is possible to minimize the occurrence of inconvenience caused by the light reflected by the inner surface of the hood 7 to be incident on the imaging unit 4.

It is noted that the reading device 1 includes a control unit and a memory unit. The memory unit is configured with, for example, a storage device such as a solid state drive (SSD) memory, or a flash memory. The memory unit stores a control program, a merchandise master, imaging conditions, and the like.

The control unit is configured with a computer including a central processing unit (CPU), a read only memory (ROM), and a random access memory (RAM). The CPU controls overall operations of the reading device 1. The ROM stores various programs such as a program used to drive the CPU and various data. The RAM stores the imaging data and the like of the imaging unit 4. In addition, the RAM is used as a work area of the CPU and loads various programs and various data stored in the ROM and the memory unit. The control unit executes various control processes of the reading device 1 by operating the CPU according to the control program stored in the ROM or the memory unit and loaded into the RAM.

With the above configuration, the reading device 1 illuminates the surface of the merchandise held by the user in the reading window 3 by the main illumination unit 5 and the auxiliary illumination unit 6 and images the surface of the illuminated merchandise by the imaging unit 4. In addition, the reading device 1 identifies the merchandise by obtaining a code symbol attached to the surface of the merchandise or a feature data of the appearance of the merchandise from the imaging data output by the imaging unit 4 and querying a predetermined database for the information obtained by decoding the code symbol or the information associated with the feature data.

It is noted that the reading device 1 may be configured to perform processes until outputting the imaging data, and a sales data processing device such as a POS terminal device or an external device may be configured to perform processes from extraction of the code symbol and the feature data from the imaging data to the identification of the merchandise.

In the operation of the reading device 1 as described above, the main illumination unit 5 illuminates the range A slightly away from the reading window 3, and the auxiliary illumination unit 6 illuminates the range B close to the reading window 3. Therefore, it is possible to illuminate the merchandise from the reading device 1 to a range slightly away from the vicinity of the reading window 3.

In the related art, in many cases, a light source is built into the housing together with an imaging unit, and in such a configuration, if the light source is made to emit light with an output that can ensure sufficient reading performance, a user is allowed to feel glare. In addition, in the case where the output of the light source is strong, if the merchandise is pressed against the reading window, the captured image may be overexposed, and thus, the merchandise information may not be obtained. However, if the output of the light source is suppressed, the reading performance may be insufficient. In contrast to the configuration of the related art in which these inconveniences may occur, the reading device 1 of the embodiment can prevent or alleviate these inconveniences.

That is, in the reading device 1 of the embodiment, since the main illumination unit 5 provided on the upper edge portion of the reading window 3 and emitting the light outward the housing 2 is configured to perform the illumination, even if the output of the light source 51 is set to be lower than that in the related art, it is possible to ensure sufficient reading performance.

In addition, since the main illumination unit 5 performs the illumination with the light passing through the diffusion plate 54, the user does not directly see the light emitted by the light source 51, so that it is possible to minimize the inconvenience of allowing the user to feel glare.

In addition, in the reading device 1 of the embodiment, since the auxiliary illumination unit 6 is configured to illuminate the position close to the reading window 3 which is difficult to be illuminated by the main illumination unit 5, it is possible to widen the readable range of the merchandise, in particular, the vicinity of the reading window 3 that is easy for the user to use can be allowed to be disposed in the readable range.

In addition, since the auxiliary illumination unit 6 performs the illumination with the light passing through the diffusion film 64, the user does not directly see the light emitted by the light source 61, so that it is possible to minimize the inconvenience of allowing the user to feel glare.

In addition, since the auxiliary illumination unit 6 also performs the illumination from the inside of the reading window 3, even if the imaging target is pressed against the reading window 3, the imaging target can be illuminated. Therefore, the reading device 1 of the embodiment can also capture an image of an imaging target pressed against the reading window 3.

In addition, the reading device 1 of the embodiment includes a light shielding unit 8 that blocks the light in a range (for example, the range C in FIG. 4) that may interfere with the imaging of the imaging unit 4 out of the light emitted by the auxiliary illumination unit 6 provided in the housing 2. Accordingly, even if the auxiliary illumination unit 6 is built in the housing 2 together with the imaging unit 4, it is possible to minimize unwanted appearance (of a photograph) of the light emitted by the auxiliary illumination unit 6, so that it is possible to obtain good reading performance.

It is noted that, in the implementation, the inner peripheral surface 631 surrounding the space interposed between the board 62 and the diffusion film 64 may be made of a material having a property of easily reflecting light. With such a configuration, it is possible to expect an increase in the light incident on the diffusion film 64.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A reading device for obtaining information that identifies a merchandise, comprising:
    a housing which includes a reading window that transmits light;
    an imaging component in the housing that captures an image through the reading window;
    a main illumination component which illuminates an imaging target located on an opposite side of the imaging component with the reading window interposed therebetween by emitting light outward the housing and is arranged on an upper edge portion of the reading window; and
    an auxiliary illumination component which illuminates the imaging target by emitting the light outward the housing through the reading window and is arranged on an inner side relative to the main illumination component.

2. The reading device according to claim 1, wherein the main illumination component is provided so as to be inclined so that the emitted light gradually travels away from the housing while traveling downward from above the reading window.

3. The reading device according to claim 1, wherein the main illumination component includes a light source and a reflecting portion that is provided at least a portion around the light source and reflects the light emitted by the light source and directs the light to the imaging target.

4. The reading device according to claim 3,
    wherein a plurality of the light sources are arranged side by side in a horizontal direction, and
    wherein the reflecting portion is provided above and below the light source.

5. The reading device according to claim 1, wherein a portion of the housing surrounding the reading window projects to the opposite side of the imaging component with the reading window interposed therebetween.

6. The reading device according to claim 1, further comprising:
    a control component and a memory, the memory stores a control program, a merchandise master, and imaging conditions, the control component controls imaging conditions of the main illumination component and the auxiliary illumination component.

7. The reading device according to claim 1, wherein the inner side of the housing reflects light.

8. A reading method for obtaining information of merchandise, comprising:
    capturing, with an imaging component, an image through a light transmissible reading window in a housing;
    illuminating, with a main illumination component, an imaging target located on an opposite side of the imaging component with the reading window interposed therebetween by emitting light outward the housing from an upper edge portion of the reading window; and
    illuminating, with an auxiliary illumination component, the imaging target by emitting the light outward the housing through the reading window from an inner side relative to the main illumination component.

9. The reading method according to claim 8, further comprising:
    illuminating, with a main illumination component, so that the emitted light gradually travels away from the housing while traveling downward from above the reading window.

10. The reading method according to claim 8, further comprising:

reflecting at least a portion of the light emitted by the light source and directing the light to the imaging target.

11. The reading method according to claim 10, wherein a plurality of the light sources are arranged side by side in a horizontal direction, and wherein the reflecting is provided above and below the light source.

12. The reading method according to claim 8, further comprising:
projecting the light to the opposite side of the imaging component with the reading window interposed therebetween.

13. The reading method according to claim 8, further comprising:
controlling imaging conditions of the main illumination component and the auxiliary illumination component.

14. A point of sale terminal, comprising:
a payment processing component that processes payment of merchandise; and
a reading device for obtaining information that identifies the merchandise, comprising:
   a housing which includes a reading window that transmits light;
   an imaging component in the housing that captures an image through the reading window;
   a main illumination component which illuminates an imaging target located on an opposite side of the imaging component with the reading window interposed therebetween by emitting light outward the housing and is arranged on an upper edge portion of the reading window; and
   an auxiliary illumination component which illuminates the imaging target by emitting the light outward the housing through the reading window and is arranged on an inner side relative to the main illumination component.

15. The point of sale terminal according to claim 14, wherein the main illumination component is provided so as to be inclined so that the emitted light gradually travels away from the housing while traveling downward from above the reading window.

16. The point of sale terminal according to claim 14, wherein the main illumination component includes a light source and a reflecting portion that is provided at least a portion around the light source and reflects the light emitted by the light source and directs the light to the imaging target.

17. The point of sale terminal according to claim 16, wherein a plurality of the light sources are arranged side by side in a horizontal direction, and wherein the reflecting portion is provided above and below the light source.

18. The point of sale terminal according to claim 14, wherein a portion of the housing surrounding the reading window projects to the opposite side of the imaging component with the reading window interposed therebetween.

19. The point of sale terminal according to claim 14, further comprising:
a control component and a memory, the memory stores a control program, a merchandise master, and imaging conditions, the control component controls imaging conditions of the main illumination component and the auxiliary illumination component.

20. The point of sale terminal according to claim 14, wherein the inner side of the housing reflects light.

\* \* \* \* \*